March 5, 1929.  W. O. PARSON ET AL  1,704,336
BATTERY TERMINAL
Filed April 8, 1927    2 Sheets-Sheet 1
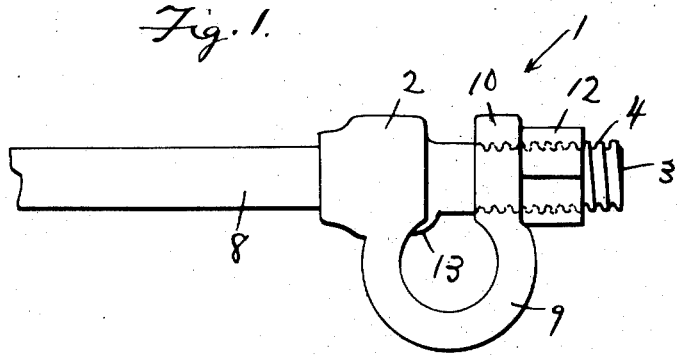
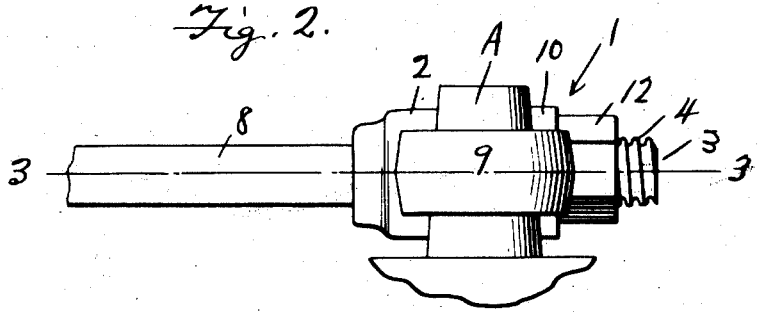
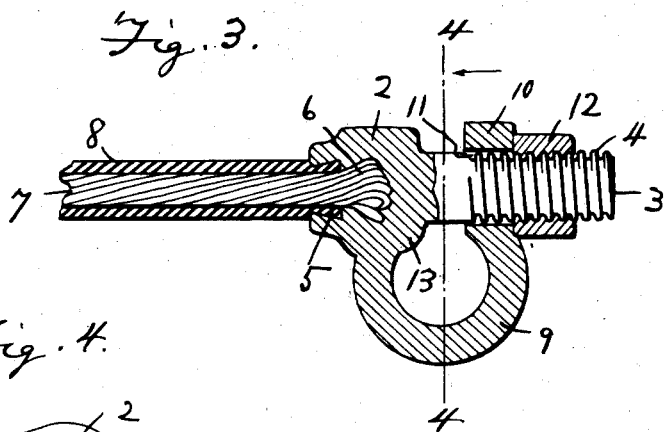
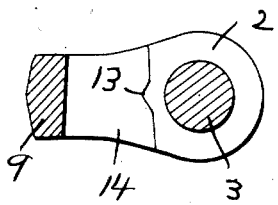
Inventor
Walter O. Parson
Jacob F. Smith
By Clarence A. O'Brien
Attorney March 5, 1929.  W. O. PARSON ET AL  1,704,336
BATTERY TERMINAL
Filed April 8, 1927   2 Sheets-Sheet 2
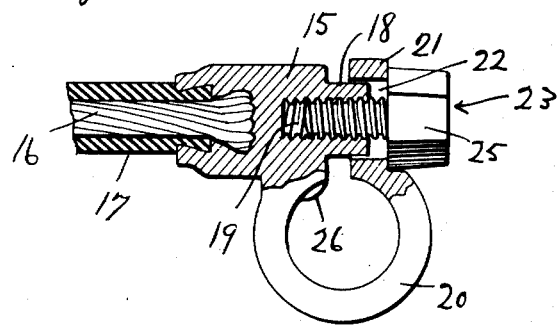
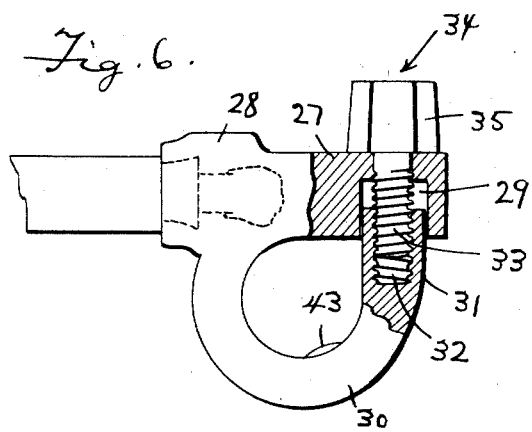
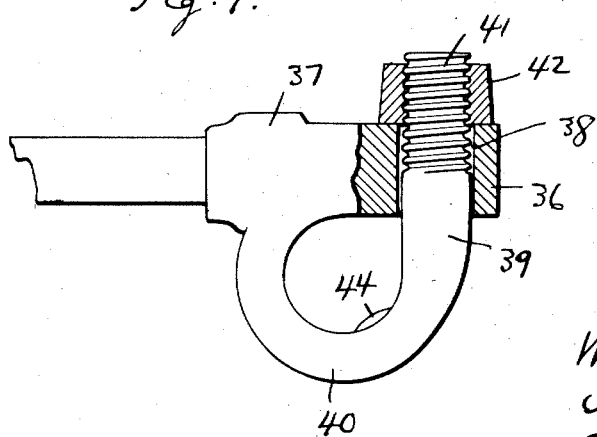
Inventor
Walter O. Parson
Jacob F. Smith
By Clarence A. O'Brien
Attorney Patented Mar. 5, 1929.

1,704,336

UNITED STATES PATENT OFFICE.

WALTER O. PARSON AND JACOB F. SMITH, OF GENESEO, ILLINOIS; SAID SMITH ASSIGNOR TO SAID PARSON.

BATTERY TERMINAL.

Application filed April 8, 1927. Serial No. 182,071.

The present invention relates to improvements in storage battery connectors and has reference more particularly to a terminal wherein the same includes a body portion in which is secured one end of the conductor cable, additional means being carried by the body portion for locking engagement over the storage battery terminal post.

One of the important objects of the present invention is to provide a battery terminal of the above mentioned character which includes a split-ring for disposition over the battery terminal post, means being provided for contracting the free ends of the ring together so that the same will be secured on the battery terminal post against accidental displacement therefrom yet permitting the terminal to be readily and easily removed or disengaged from the post whenever necessary.

A further object of the invention is to provide a battery terminal of the above mentioned character wherein the body portion is formed with a socket for receiving one end of the conductor cable and the adjacent end of the insulated covering therefor, the outer end of the socket being adapted to be clamped around the end portion of the insulation to secure the conductor cable to the body in a rigid and permanent manner.

A further object of the invention is to provide a battery terminal of the above mentioned character which is simple in construction, inexpensive, and furthermore adapted to the purposes for which the same is designed.

Other objects and advantages of this invention will become apparent during the course of the following description.

In the accompanying drawings forming part of this specification and in which like numerals are employed to designate like parts throughout the same:

Figure 1 is a top plan view of one form of the invention.

Figure 2 is a side elevation thereof showing the same attached to the post of a storage battery, Figure 3 is a longitudinal sectional view taken approximately on the line 3—3 of Figure 2.

Figure 4 is a transverse section taken on the line 4—4 of Figure 3 looking in the direction of the arrow, Figure 5 is a view partly in elevation and partly in section of one modification of the present invention.

Figure 6 is a similar view of a further modification, and

Figure 7 is a similar view of still another modification.

In the drawings with reference more particularly to Figures 1 to 4 inclusive, the numeral 1 designates generally the improved battery terminal the same comprising the solid body portion 2 which is formed preferably of lead. Extending outwardly from the inner end of the body portion 2 is the shank 3 and major portion of this shank is threaded as indicated at 4 for a purpose to be hereinafter more fully described.

The other end portion of the lead body 2 is formed with a socket 5 which communicates with an opening 6 formed in the central portion of the body 2 and the end of the conductor cable 7 has its strands of wire embedded in the body 2 in the opening 6. The adjacent end of the insulated covering 8 which encloses the conductor cable 7 is disposed within the socket 5 and due to the fact that the body 2 is formed of lead, the end portion of the body around the socket 5 is adapted to be clamped inwardly into biting engagement with the flexible insulated covering 8 whereby said covering will be pinched and this is clearly illustrated in Figure 3. In this manner, the end of the cable and its insulated covering will be attached to the body portion 2 of the terminal.

Also forming a part of the present terminal is the flat ring 9 which has one end thereof formed integrally with one side of the body 2 as is clearly shown in Fig. 3. The free end of this flat ring 9 is formed with a laterally disposed ear 10 which is formed with an opening 11 of a diameter slightly greater than the diameter of the threaded shank 3 so that said shank may be free to pass through the opening 11. The apertured ear 10 is disposed in spaced relation with respect to the outer end of the body 2 and this ring is adapted for disposition over the terminal post of an electric storage battery in a manner clearly shown in Fig. 2. The post of the battery is illustrated at A.

A nut 12 is threaded on the outer end of the shank 3 and is adapted for engagement with the outer side of the apertured ear 10 for forcing the ear inwardly on the shank towards the head 2 whereby said ring may be contracted and locked on the post A in a secure manner for obviously preventing the accidental displacement of the terminal from the post.

For the purpose of further locking the split ring on the post against rotation, there is formed on the inner peripheral face of ring a tooth 13 and this tooth will bite into the side of the post A. This tooth is preferably formed at the juncture of the split ring 9 with the outer end portion of the solid body 2 in a manner clearly shown in Figs. 1 and 3. Furthermore the ring 9 has its bore tapering gradually towards the top face thereof as illustrated at 14 in Fig. 4 in order to further permit the ring to properly engage over the tapered post A.

With reference now to Fig. 5 of the drawings, there is shown a modification of the battery terminal. The body portion 15 has its inner end formed with a socket for receiving one end of the conductor cable 16 and the insulated covering 17 therefor in the same manner as has been heretofore described with reference to the construction shown in Figs. 1 to 4 inclusive. A relatively small shank 18 extends from the outer end of the head 15 and this shank is formed with an internally threaded bore which extends into the body portion 15 as illustrated at 19.

The split ring 20 which is adapted for disposition over the post A has one end thereof integrally associated with the outer end portion of the body 15 at the side thereof and the free end of this split ring is formed with a laterally disposed ear 21 which is formed with an enlarged opening 22 whereby said ear may be slidably disposed over the relatively short shank 18.

A headed bolt has its shank 24 threaded into the threaded recess 19 provided therefor in the shank 18 and the outer end portion of the body 15 and the head 25 of this bolt, designated generally by the numeral 23 has its inner face engaging the outer side face of the ear 21 so that when the head 25 of the bolt 23 is rotated in one direction, the ear 21 will move inwardly on the shank 18 whereby said ring 20 will be contracted for locking the same in position over the battery terminal post. A tooth 26 similar to the tooth 13 is associated with the split ring and the body for further securing the terminal shown in Fig. 5 on the post against rotation.

In Fig. 6, a further modification is shown wherein a shank portion 27 which extends outwardly from the outer end of the body 28 is of a thickness slightly less than the thickness of the body and this shank is formed in one side face with a socket 29 which extends from one face inwardly to a point adjacent the opposite side face of the shank in a manner clearly illustrated in the drawings. A split ring 30 which is integrally associated at one end with the body 28 has its free end 31 of such formation as to be adapted to extend into the socket 29 and the free end 31 of this split ring 30 is formed with a threaded recess 32 for receiving the threaded shank 33 of a bolt designated generally by the numeral 34, the head of the bolt being designated by the numeral 35. The closed end of the socket is formed with an opening to accommodate the shank 31 of the bolt 34 and manifestly by rotating the head 35 in one direction, the threaded end or shank 33 will cooperate with the internally threaded opening 32 for moving the free end portion 31 of the split ring 30 inwardly toward the closed end of the socket 29 thus contracting the split ring and locking the same on the battery terminal post in an obvious manner. The inner face of the head 35 will engage the side face of the shank 27 opposite that in which the socket is formed so that the bolt cannot move longitudinally but will only be permitted to rotate when the head 35 of the bolt 34 is actuated.

In Fig. 7, a still further modification of the battery terminal embodying our invention is disclosed. In this particular form, the shank 36 which projects from the outer end of the body 37 is also of a thickness slightly less than that of the body and the outer end of this shank is formed with a through transverse bore or opening 38 through which is freely slidable the free end portion 39 of the split ring 40, the other end of which is integrally associated with the body 37. The outer end of the free end 39 of the split ring 40 is externally threaded as indicated at 41 and cooperating therewith is the nut 42. The threaded end 41 extends beyond the outer face or side of the shank 36 and the nut 42 is adapted to have its inner face engage the outer face of the shank and manifestly by further rotating the nut, the threaded end 41 will move outwardly thus causing the split ring 40 to be contracted for securing the same in position on the battery terminal post.

A tooth 43 is arranged on the inner peripheral face of the split ring 30 shown in the modification in Fig. 6 for preventing the rotation of the ring 30 on the battery terminal post. A similar tooth 44 is formed on the inner peripheral face of the split ring 40 of the modification shown in Fig. 7 for locking this particular form of the terminal against rotation on the post of the battery.

It will thus be seen from the foregoing description that we have provided a battery terminal which is of such construction as to permit the same to be readily attached or detached with respect to the terminal post of a storage battery and furthermore the split ring may be readily and easily adjusted without the loss of any considerable length of time or labor. Also by securing one end of the conductor cable and its insulated covering in the body portion of the terminal in the manner as herein set out, a permanent and rigid connection between the cable and the terminal will be provided.

While we have shown the preferred embodiment of our invention, it is to be understood that various changes in the size, shape and arrangement of parts may be resorted to without departing from the spirit or sacrificing any of the advantages of the appended claim.

What we claim is:

In a battery terminal of the class described, a body portion, a conductor cable secured at one end to one end of the body, a shank formed on the other end of the body and threaded for the greater portion of its length, a split ring for disposition over a battery terminal post, one end of the split ring being connected with the side of the body, a laterally extending ear formed on the free end of the split ring, said ear being provided with an aperture that is slightly greater than the diameter of the threaded shank and over which shank said apertured ear is slidable, a nut threaded on the shank for engagement with the outer face of the ear whereby said split ring may be contracted for locking engagement over the post, and a tooth formed on the inner peripheral face of the split ring at the juncture of the ring with the outer end portion of the body adapted to bite into the post to additionally secure the terminal thereon.

In testimony whereof we affix our signatures.

WALTER O. PARSON.
JACOB F. SMITH.